No. 623,395. Patented Apr. 18, 1899.
J. W. CORNETT.
ROAD GRADING AND DITCHING MACHINE.
(Application filed May 18, 1898.)

(No Model.) 3 Sheets—Sheet 2.

WITNESSES:

INVENTOR
J. W. Cornett.
BY
ATTORNEYS.

No. 623,395. Patented Apr. 18, 1899.
J. W. CORNETT.
ROAD GRADING AND DITCHING MACHINE.
(Application filed May 18, 1898.)
(No Model.) 3 Sheets—Sheet 3.
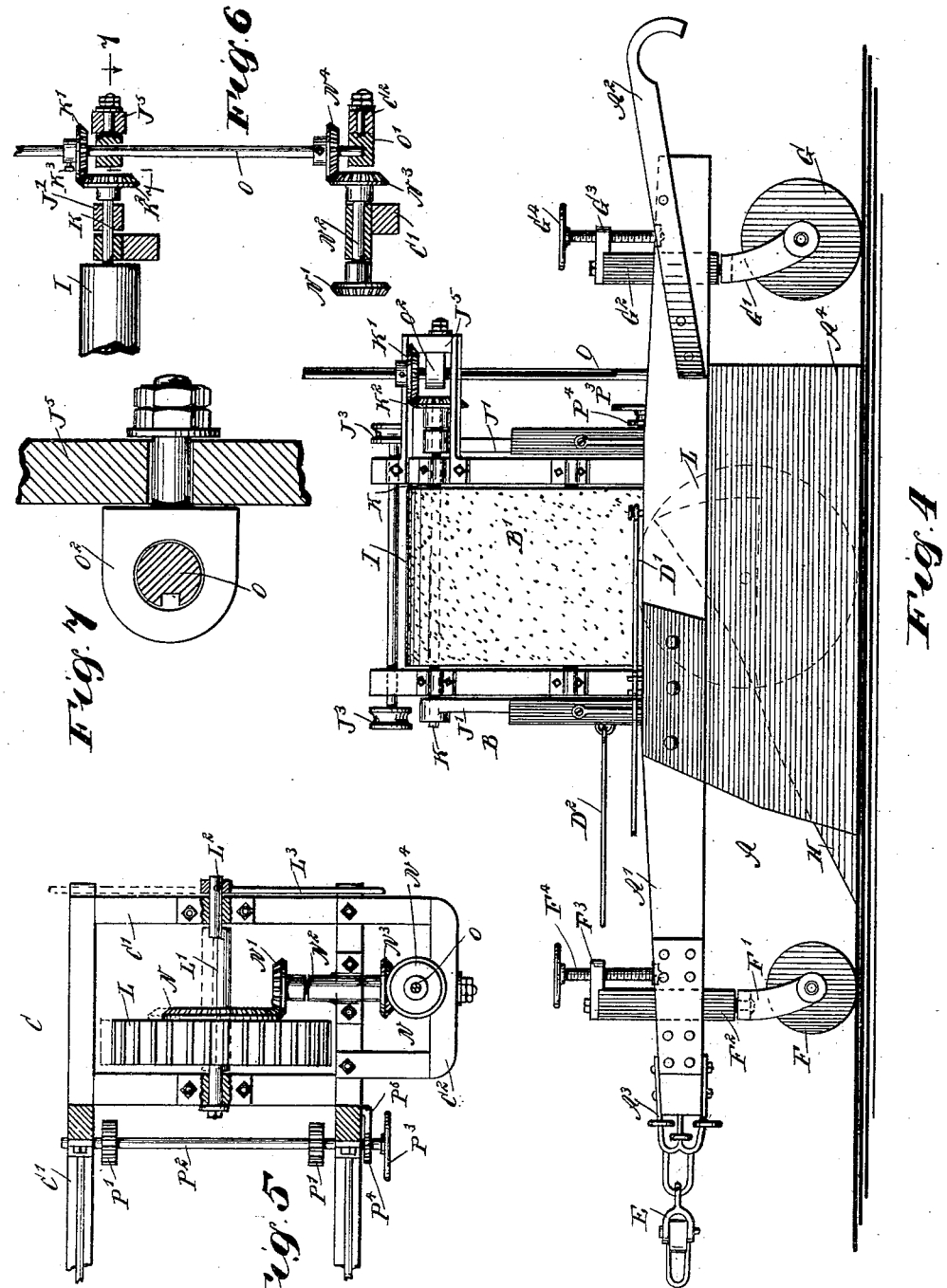
WITNESSES:
INVENTOR
J. W. Cornett.
BY
ATTORNEYS.

UNITED STATES PATENT OFFICE.

JAMES WILLIAM CORNETT, OF GALVESTON, TEXAS.

ROAD-GRADING AND DITCHING MACHINE.

SPECIFICATION forming part of Letters Patent No. 623,395, dated April 18, 1899.

Application filed May 18, 1898. Serial No. 681,042. (No model.)

*To all whom it may concern:*

Be it known that I, JAMES WILLIAM CORNETT, of Galveston, in the county of Galveston and State of Texas, have invented a new and Improved Road-Grading and Ditching Machine, of which the following is a full, clear, and exact description.

The object of the invention is to provide a new and improved road-grading and ditching machine which is comparatively simple and durable in construction, very effective in operation, and arranged to remove the plowed-up ground quite a distance from one side of the machine and to permit of conveniently throwing the working parts out of gear while moving the machine from one place to another.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1:
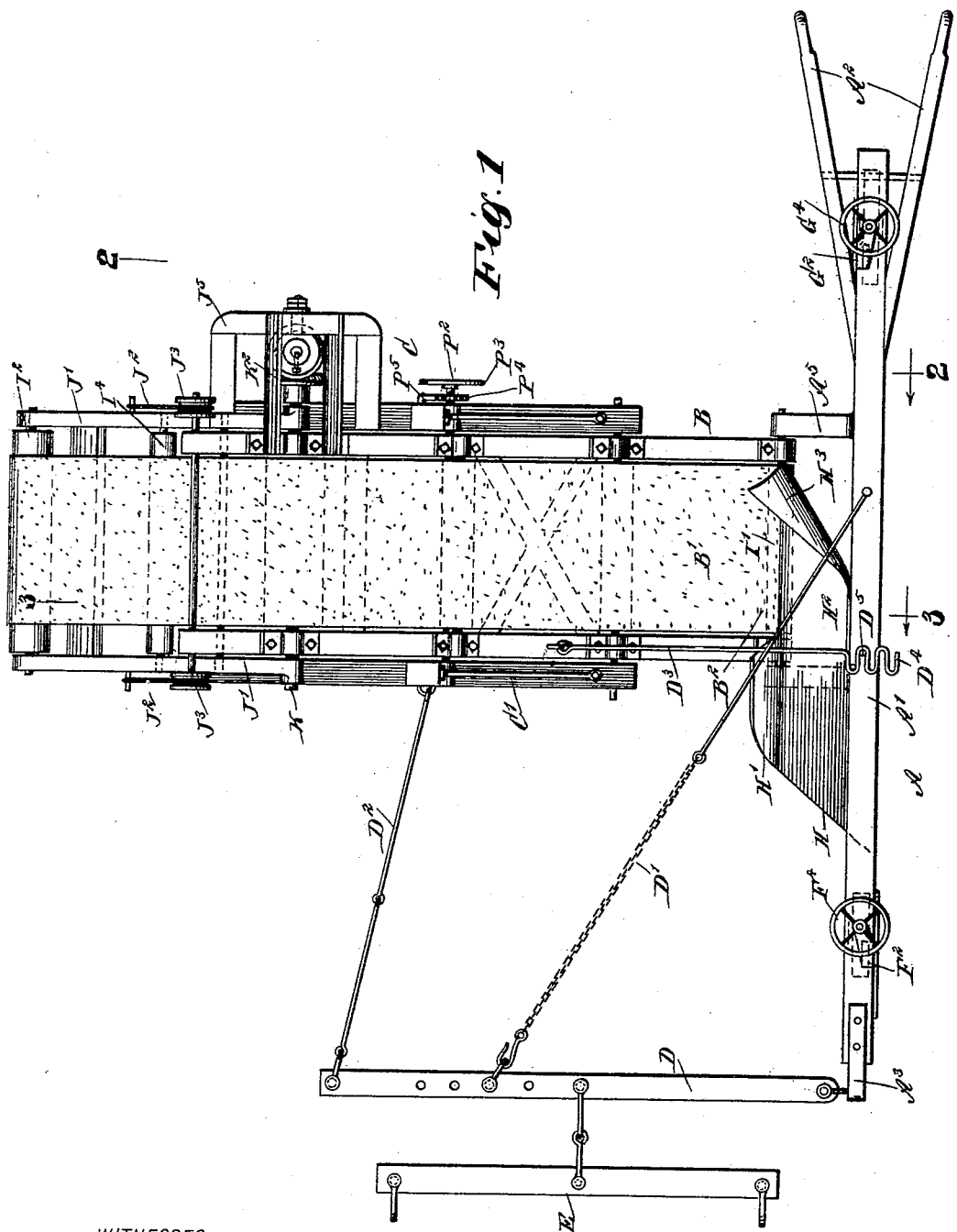
Figure 2:
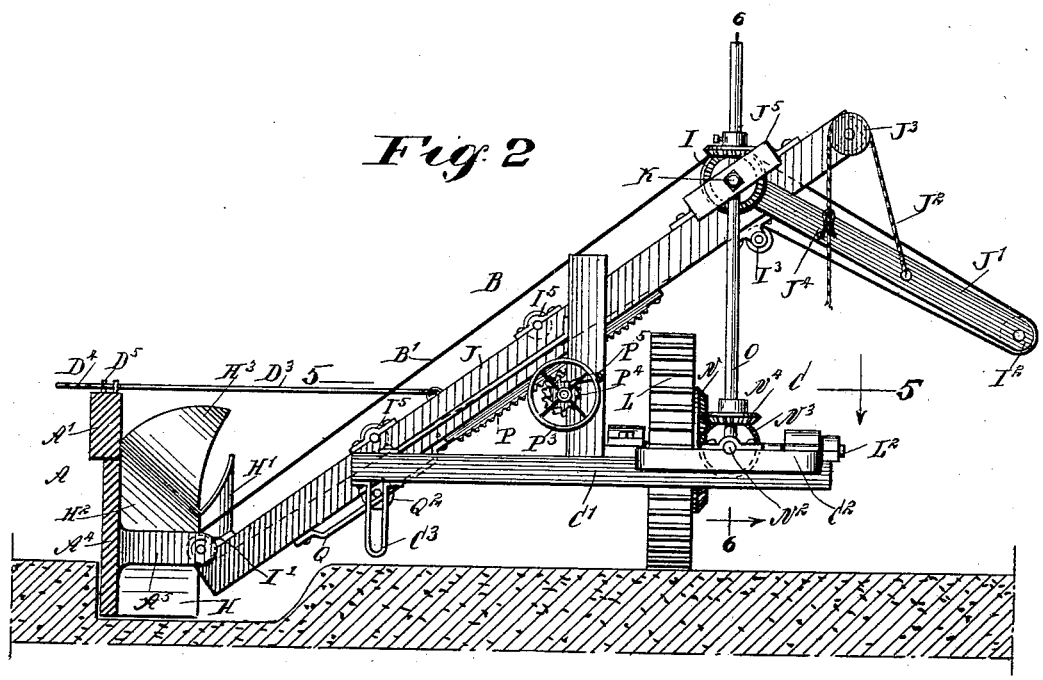
Figure 3:
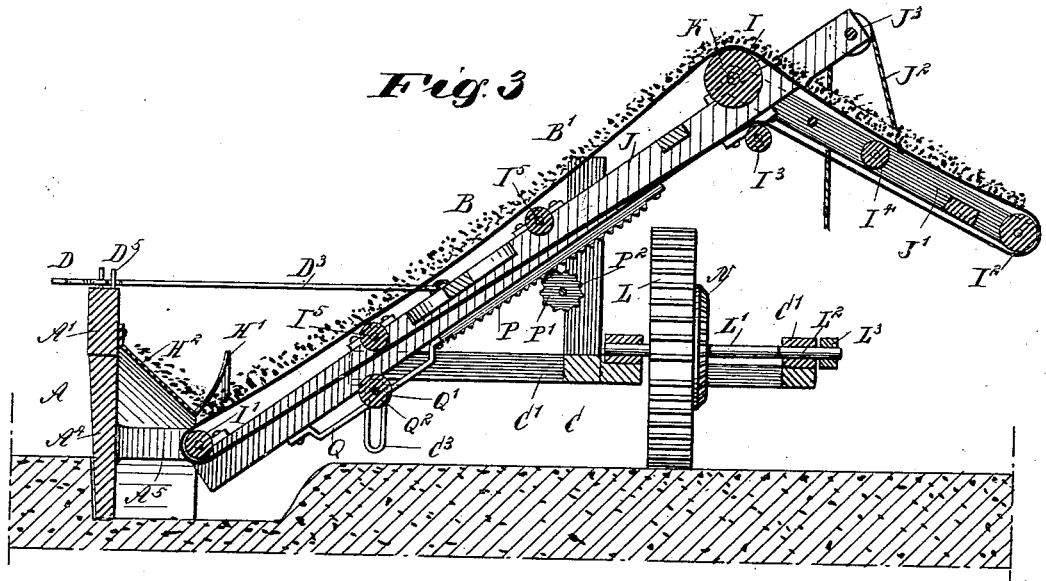

Figure 1 is a plan view of the improvement. Fig. 2 is a cross-section of the same on the line 2 2 of Fig. 1. Fig. 3 is a similar view of the same on the line 3 3 of Fig. 1. Fig. 4 is a side elevation of the improvement. Fig. 5 is a sectional plan view of part of the same on the line 5 5 of Fig. 2. Fig. 6 is a sectional side elevation of the gearing for the elevator-belt, and Fig. 7 is an enlarged plan view of part of the same on the line 7 7 of Fig. 6.

The improved machine consists of three principal parts—namely, the plow A, the transversely-extending elevator B, and the wheeled carrier C for supporting the outer end of the elevator and for imparting motion to the working parts thereof, as hereinafter more fully described, the three parts, however, moving in unison when drawn forward by a team or other power. The plow A is provided with the usual plow-beam A', having handles $A^2$ at its rear end for allowing the operator to conveniently manipulate and guide the plow in the usual manner.

On the forward end of the plow-beam A' is arranged a clevis $A^3$, supporting at one end a draft-beam D, connected by a brace D' with the rear portion of the plow-beam and by a brace $D^2$ with the framework C' of the wheeled carrier C. On the draft-beam D is hung the usual doubletree E, to which the team is attached for drawing the machine over the ground. The front and rear ends of the plow-beam A' are supported on wheels F and G, arranged for vertical adjustment, so as to gage the depth of the cut to be made by the plow. The wheels F and G are mounted in caster-frames F' G', respectively mounted to turn on the lower ends of bars $F^2$ and $G^2$, fitted to slide vertically in suitable bearings in the beam A', the upper ends of said bars being provided with nuts $F^3$ $G^3$, engaged by screw-rods $F^4$ $G^4$, mounted to turn at their lower ends in suitable bearings on the plow-beam, so that when the operator turns either screw-rod the corresponding bar $F^2$ or $G^2$ is raised or lowered to move the wheel F or G in a like direction and according to the direction in which the screw-rod is turned.

The plow-beam A' supports between the wheels F and G the usual landside $A^4$ and the moldboard H, formed at its outer end with an upwardly-turned flange H', terminating at its rear end on the lower edge of an inclined chute $H^2$, formed with a transversely-curved flange $H^3$ for directing the rearwardly-moving ground down the chute upon the belt B' of the elevator B, as will be readily understood by reference to Fig. 3.

Now it is evident that when the plow is drawn forward the ground plowed up by the plow-point and passing over the moldboard H in a rearward direction finally passes over the chute $H^2$ down upon the elevator-belt B' and is carried upward on the same in a transverse direction to be delivered either at one side of the road or ditch or into a wagon underneath the outer end of said elevator. The upper run of the elevator-belt passes over a driving-drum I, journaled near the upper end of the elevator-frame J, pivoted at its lower end on brackets $A^5$, extending transversely on the landside $A^4$, as is plainly shown in the drawings. The elevator-belt also passes at its lower end over a pulley I', journaled in the brackets $A^5$, its shaft preferably forming the fulcrum for the frame J. The outer rear end of the elevator-belt passes over a pulley $I^2$, journaled in a frame J', pivoted on the shaft K for the drum I, so that any desired inclination can be given to the said frame J' relatively to the frame J. Chains J² connect with the side beams of the frame J' and pass over pulleys J³, journaled in the upper ends of the frame J, the downwardly-hanging ends of the chains being attached to suitable catches J⁴ on the frame J' for holding the latter in the desired position. The lower run of the elevator-belt B' passes over a pulley I³, journaled on the under side of the frame J, and the upper run is adapted to be supported on intermediate rollers I⁴ I⁵, journaled on the frames J' and J.

Now in order to impart a rotary motion to the drum I from the wheeled carrier C, I provide the following device: A traction-wheel L is mounted to rotate loosely on the crank-arm L' of an axle L², journaled in suitable bearings on the frame C' and provided at one end with a handle L³ for turning the axle into one of two positions, so as to connect or disconnect the bevel gear-wheel N with or from a bevel gear-wheel N'. The bevel gear-wheel N is secured to the face of the traction-wheel N and is normally in mesh with the bevel gear-wheel N', secured on a longitudinally-extending shaft N², journaled in suitable bearings on the frame C'. (See Fig. 6.) The outer end of the shaft N² is provided with a bevel gear-wheel N³ in mesh with a bevel gear-wheel N⁴, secured to an upwardly-extending shaft O, journaled at its lower end in a bearing O', mounted to rock in a bracket C², secured to the frame C', as shown in the drawings.

The upper end of the shaft O is mounted to turn and to slide in a bearing O², likewise mounted to rock in a bracket J⁵, secured to one side of the elevator-frame J. On the upper end of the shaft O is adjustably held a bevel gear-wheel K' in mesh with a bevel gear-wheel K², secured on the shaft K, carrying the drum I, so that when the machine is moved forward and the traction-wheel L is rotated then a rotary motion is transmitted by the gearing described to the drum I to rotate the latter in the direction of the arrow $a'$ and cause the belt B' to travel upward to move the ground to one side of the machine, as previously explained. When the machine is moved from one place to another, then the operator throws the handle L³ from the position shown in Fig. 5 over into the position shown in dotted lines in said figure to cause the axle L² to make a half-turn and move the bevel gear-wheel N out of mesh with the bevel gear-wheel N'. The gearing above described then remains at a standstill, while the traction-wheel L, with its wheel N, is free to rotate while the machine is drawn from one place to another.

The elevator-frame J is supported from the wheeled carrier C, and a desired inclination can be given to said frame J and consequently the belt B', and for this purpose the following device is provided: On the under side of the side beams of the frame J are secured racks P in mesh with a gear-wheel P', secured on a longitudinally-extending shaft P², journaled in suitable bearings on the frame C' of the wheeled carrier C, one outer end of said shaft being provided with a hand-wheel P³ under the control of the operator for turning the shaft P² and the gear-wheel P' and causing the elevator-frame J to travel up and down, according to the direction in which the hand-wheel P³ is turned. On the shaft P² is also secured a ratchet-wheel P⁴, engaged by a pawl P⁵, fulcrumed on the frame C', for locking the said ratchet-wheel in position after the desired adjustment of the elevator-frame is made. It is evident that when the plow A is moved laterally on its level while causing the frame J to move upward then a steeper inclination is given to the said frame J, and when the latter is moved downward by the wheels P' and the plow is moved outward from the wheeled carrier then a less inclination is given to the frame J. It will further be seen that by the arrangement described the plow A can move way down into the ditch while the wheeled carrier C still remains on one side of the level ground, as the adjustment is made correspondingly—that is, the frame J is moved into a corresponding steep inclined position to maintain the plow in the ditch and the wheeled carrier on the level of the ground without disconnecting the two and without disturbing the coaction of the same, as described.

In order to properly guide the frame J when turning the wheels P' as described, I provide the under side of the side beams of the frame J with guideways Q, engaged by a shaft Q', carrying a roller Q², over which passes the lower run of the elevator-belt B'. The ends of the shaft Q' are free to slide in vertical guideways C³, depending from the frame C' of the wheeled carrier C.

It is expressly understood that as the elevator-frame J is pivoted to the plow in the manner described the relation between the chute H² and the belt B' is always maintained, so that the ground N falls upon the belt and is carried upward by the same for delivering the ground at one side of the machine or to a cart below the rear end of the belt.

In order to connect the elevator-frame J with the plow-beam A' for maintaining the same in a proper position, I provide a transverse brace D³, pivoted on the frame J and formed at its forward end with a series of notches D⁴, adapted to engage one or more pins D⁵, secured to the top of the plow-beam A'. When the frame J is adjusted—that is, when its inclination is changed as described—then the brace D³ is disconnected for the time being, and after adjustment is made the brace is connected with one of its notches D⁴ with the pin D⁵. The shaft O is mounted in bearings adapted to turn as described, so as to allow the shaft to swing into proper position when increasing or decreasing the inclination of the frame, it being understood that while such adjustment is made the wheel K' is loosened on the shaft O, so as to permit the shaft O to properly adjust itself until the desired position of the elevator is reached. The wheel K' is then again secured to the shaft by a suitable set-screw K³, engaging a keyway on the shaft O; but other suitable means may be employed.

Having thus fully described my invention, I claim as new and desire to secure by Letters Patent—

1. A road-grading and ditching machine, comprising a plow, a wheeled carrier at one side of the plow, a transversely-extending elevator supported upon the carrier, and having its inner end pivotally connected with the plow, whereby the elevator serves as a means for connecting the plow and carrier, and means for operating the elevator from the carrier, substantially as described.

2. A road-grading and ditching machine, comprising a plow, a wheeled carrier, an elevator-frame supported on the carrier and having its inner end pivotally connected with the moldboard of the plow, an elevator-belt mounted in the said frame, and means for operating the elevator-belt from the wheel of the carrier, substantially as described.

3. A road-grading and ditching machine, comprising a plow provided with a moldboard having its outer end formed with an upwardly-turned flange and provided with an inclined chute upon which the moldboard delivers, a wheeled carrier, an elevator-frame supported upon the carrier and having its inner end pivotally connected with the moldboard of the plow below the inclined chute, an elevator-belt mounted in the said frame, and means for operating the belt from the wheel of the carrier, substantially as described.

4. In a road-grading and ditching machine, the combination with a plow, of a wheeled carrier at one side of the plow, a transversely-extending elevator supported upon the carrier and having its inner end pivotally connected to the plow, means for operating the elevator from the carrier, and means for adjusting the inclination of the elevator, substantially as described.

5. In a road-grading and ditching machine, the combination with a plow, of a wheeled carrier, an elevator supported upon the carrier and having its inner end pivotally connected with the plow, and means for moving the plow toward and from the carrier, whereby the inclination of the elevator will be adjusted, substantially as described.

6. In a road-grading and ditching machine, the combination with a plow, of a wheeled carrier, an elevator-frame supported upon the carrier and having its inner end pivotally connected with the plow, the under face of the elevator-frame being provided with a rack, an elevator-belt mounted in the frame, a gear-wheel mounted upon the carrier and engaging the rack of the elevator-frame, and means for turning said gear-wheel, substantially as described.

7. In a road-grading and ditching machine, the combination with a plow, of a wheeled carrier, an elevator mounted to have guided movement upon the carrier and having its inner end pivotally connected to the plow, the under face of the elevator-frame being provided with a rack, a gear-wheel mounted upon the carrier and engaging the said rack, means for operating the gear-wheel, an elevator-belt mounted in the elevator-frame, and means for operating the elevator-belt from the wheel of the carrier, substantially as described.

8. In a road-grading and ditching machine, the combination with a plow, of a carrier-frame mounted upon a traction-wheel, an elevator-frame supported upon the carrier-frame and having its inner end pivotally connected with the plow, a driving-drum mounted near the outer end of the elevator-frame, an elevator-belt passing over said drum and a pulley at the inner end of the said frame, and gearing between the said drum and the traction-wheel, substantially as described.

9. In a road-grading and ditching machine, the combination with a plow, of a carrier-frame supported upon a traction-wheel mounted upon a crank-axle, an elevator-frame supported upon the carrier-frame and having its inner end pivotally connected with the plow, a driving-drum mounted near the outer end of the elevator-frame, an elevator-belt passing over said drum and a pulley at the inner pivoted end of the said frame, a gear-wheel on the crank-axle, means for turning the crank-axle, and gearing between the said gear-wheel and the driving-drum, substantially as described.

10. In a road-grading and ditching machine, the combination with a wheeled carrier-frame, and a pivoted elevator supported upon the carrier-frame and provided with a driving-drum near its outer end, of a vertical shaft mounted in rocking bearings, the said shaft being fitted to slide in one of said bearings, and gearing between said vertical shaft and the driving-drum and the supporting-wheel of the carrier, substantially as described.

11. In a road-grading and ditching machine, the combination with a carrier-frame mounted upon a traction-wheel having a gear-wheel secured to its face, and a pivoted elevator supported upon the carrier-frame, and provided with a driving-drum near its outer end, said drum having a gear-wheel on the end of its shaft, of a horizontal shaft provided with a gear-wheel at each end, one of the wheels meshing with the gear-wheel of the traction-wheel, a vertical shaft mounted in rocking bearings, said shaft sliding in the upper bearing, and gear-wheels on the said vertical shaft, one of the said gear-wheels meshing with the gear-wheel of the driving-drum and the other with the gear-wheel of the horizontal shaft, substantially as described.

12. In a road-grading and ditching machine, the combination with a plow, of a wheeled carrier-frame, an elevator supported upon the carrier-frame and having its inner end pivotally connected with the plow, means for moving the plow toward and from the carrier-frame, and a brace pivoted to the elevator and adjustably connected with the plow-beam, substantially as described.

13. In a road-grading and ditching machine, a plow having its moldboard formed at its outer end with the upwardly-turned flange and provided with the transversely-curved chute, the flange of the moldboard terminating on the lower edge of the chute, substantially as and for the purpose set forth.

JAMES WILLIAM CORNETT.

Witnesses:
  SAMUEL BENNISON,
  GEORGE M. CAMPBELL.